United States Patent
Dry et al.

(10) Patent No.: US 10,471,920 B2
(45) Date of Patent: Nov. 12, 2019

(54) SEAT WITH AIRBAG

(71) Applicant: Ford Global Technologies, LLC, Dearborn, MI (US)

(72) Inventors: Alan George Dry, Grosse Pointe Woods, MI (US); Marcos Silva Kondrad, Macomb Township, MI (US); Jonathan Andrew Line, Northville, MI (US); Kevin Wayne Preuss, Berkley, MI (US); Brian Robert Spahn, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 186 days.

(21) Appl. No.: 15/664,338

(22) Filed: Jul. 31, 2017

(65) Prior Publication Data
US 2019/0031132 A1    Jan. 31, 2019

(51) Int. Cl.
*B60R 21/207* (2006.01)
*B60R 21/2165* (2011.01)
*B60R 21/233* (2006.01)
*B60R 21/2338* (2011.01)
*B60R 21/00* (2006.01)
(Continued)

(52) U.S. Cl.
CPC ........ *B60R 21/207* (2013.01); *B60R 21/2165* (2013.01); *B60R 21/233* (2013.01); *B60R 21/2338* (2013.01); *B60R 2021/0032* (2013.01); *B60R 2021/2074* (2013.01); *B60R 2021/23107* (2013.01); *B60R 2021/23386* (2013.01); *G05D 1/021* (2013.01)

(58) Field of Classification Search
CPC .. B60R 2021/2074; B60R 2021/23386; B60R 21/207; B60R 21/2338; B60R 21/2165; B60R 21/233; B60R 2021/23107; B60R 2021/0032; G05D 1/021
See application file for complete search history.

(56) References Cited

U.S. PATENT DOCUMENTS 3,753,576 A * 8/1973 Gorman ................ B60R 21/207
                                            280/730.1
3,836,168 A * 9/1974 Nonaka ................... B60R 21/08
                                            280/733
(Continued)

FOREIGN PATENT DOCUMENTS

DE         19859988 A1    6/2000
DE      102014004185 A1    9/2015
(Continued)

OTHER PUBLICATIONS

Cool Technologies Limited; "Carkoon: Kevlar car seat envelops child in fireproof cocoon," Feb. 22, 2014; 3 pages.

*Primary Examiner* — Paul N Dickson
*Assistant Examiner* — Timothy Wilhelm
(74) *Attorney, Agent, or Firm* — Frank A. MacKenzie; Bejin Bieneman PLC

(57) ABSTRACT

A seat includes a seat bottom and a seatback coupled to the seat bottom. The seatback includes a headrest and a front face facing the seat bottom. The seat includes an airbag inflatable from an undeployed position to a deployed position. The airbag in the undeployed position is supported by the front face above the headrest. The seat includes a tether extending from the seatback to the airbag.

21 Claims, 11 Drawing Sheets

(51) Int. Cl.
*B60R 21/231* (2011.01)
*G05D 1/02* (2006.01)

(56) References Cited

U.S. PATENT DOCUMENTS

| | | | | |
|---|---|---|---|---|
| 3,953,049 | A * | 4/1976 | Surace | B60R 21/08 |
| | | | | 280/730.1 |
| 4,508,294 | A * | 4/1985 | Lorch | B64D 25/02 |
| | | | | 244/122 AG |
| 5,226,672 | A * | 7/1993 | Husted | B60R 21/08 |
| | | | | 280/733 |
| 6,030,036 | A * | 2/2000 | Fohl | B60R 21/207 |
| | | | | 297/216.14 |
| 6,158,812 | A * | 12/2000 | Bonke | B60R 16/08 |
| | | | | 297/391 |
| 6,168,192 | B1 * | 1/2001 | Bauer | B60R 21/207 |
| | | | | 280/730.2 |
| 6,315,245 | B1 * | 11/2001 | Ruff | B64D 25/02 |
| | | | | 244/122 AG |
| 6,572,137 | B2 * | 6/2003 | Bossecker | B60R 21/207 |
| | | | | 280/730.1 |
| 6,805,404 | B1 * | 10/2004 | Breed | B60N 2/002 |
| | | | | 297/216.12 |
| 7,040,651 | B2 * | 5/2006 | Bossecker | B60R 21/23138 |
| | | | | 280/729 |
| 7,207,596 | B2 * | 4/2007 | Linder | B60R 21/207 |
| | | | | 280/729 |
| 7,431,331 | B2 * | 10/2008 | Siemiantkowski | B60R 21/207 |
| | | | | 280/728.2 |
| 7,445,284 | B2 * | 11/2008 | Gerfast | B60N 2/4221 |
| | | | | 297/216.12 |
| 7,878,531 | B2 * | 2/2011 | Sugimoto | B60R 21/207 |
| | | | | 280/730.1 |
| 7,918,482 | B2 * | 4/2011 | Sugimoto | B60R 21/207 |
| | | | | 280/729 |
| 8,690,187 | B2 * | 4/2014 | Fukawatase | B60R 21/207 |
| | | | | 280/730.2 |
| 8,899,619 | B2 * | 12/2014 | Fukawatase | B60R 21/207 |
| | | | | 280/730.2 |
| 9,132,798 | B2 * | 9/2015 | Yasuoka | B60R 21/2334 |
| 9,352,839 | B2 * | 5/2016 | Gehret | B60R 21/207 |
| 9,428,138 | B2 * | 8/2016 | Farooq | B60R 21/231 |
| 9,533,648 | B2 * | 1/2017 | Fujiwara | B60R 21/207 |
| 9,573,553 | B2 * | 2/2017 | Ko | B60R 21/233 |
| 9,604,588 | B1 * | 3/2017 | Rao | B60R 21/01534 |
| 9,919,673 | B2 * | 3/2018 | Ohno | B60R 21/262 |
| 9,925,943 | B2 * | 3/2018 | Ohno | B60R 21/207 |
| 9,944,246 | B2 * | 4/2018 | Ohno | B60R 21/23138 |
| 9,950,687 | B2 * | 4/2018 | Kato | B60R 21/207 |
| 10,023,147 | B2 * | 7/2018 | Kwon | B60R 21/207 |
| 10,035,484 | B2 * | 7/2018 | Jaradi | B60R 21/207 |
| 10,071,702 | B2 * | 9/2018 | Ohno | B60R 21/013 |
| 10,112,570 | B2 * | 10/2018 | Barbat | B60N 2/90 |
| 10,202,095 | B2 * | 2/2019 | Ohno | B60R 21/231 |
| 2002/0125690 | A1 * | 9/2002 | Boll | B60R 21/213 |
| | | | | 280/730.1 |
| 2013/0015642 | A1 * | 1/2013 | Islam | B60R 21/207 |
| | | | | 280/730.1 |
| 2014/0327234 | A1 * | 11/2014 | Heurlin | B60R 21/207 |
| | | | | 280/730.1 |
| 2016/0121839 | A1 * | 5/2016 | Ko | B60R 21/233 |
| | | | | 280/730.1 |
| 2017/0136976 | A1 * | 5/2017 | Ohno | B60N 2/888 |
| 2018/0222432 | A1 * | 8/2018 | Schneider | B60R 21/214 |
| 2018/0236962 | A1 * | 8/2018 | Ohno | B60R 21/207 |
| 2019/0031133 | A1 * | 1/2019 | Dry | B60R 21/2338 |
| 2019/0039556 | A1 * | 2/2019 | Jindal | B60R 21/237 |
| 2019/0054884 | A1 * | 2/2019 | Dry | B60R 21/2342 |
| 2019/0071046 | A1 * | 3/2019 | Dry | B60R 21/232 |

FOREIGN PATENT DOCUMENTS

| | | |
|---|---|---|
| JP | 2017030638 A | 2/2017 |
| WO | WO-2008038523 A1 * | 4/2008 ......... B60R 21/207 |

* cited by examiner

SEAT WITH AIRBAG

BACKGROUND

Vehicles are equipped with airbags. In the event of an impact, an inflator activates and provides inflation medium to the airbags, and the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side air curtains mounted in the roof rails.

DETAILED DESCRIPTION

Figure 1:
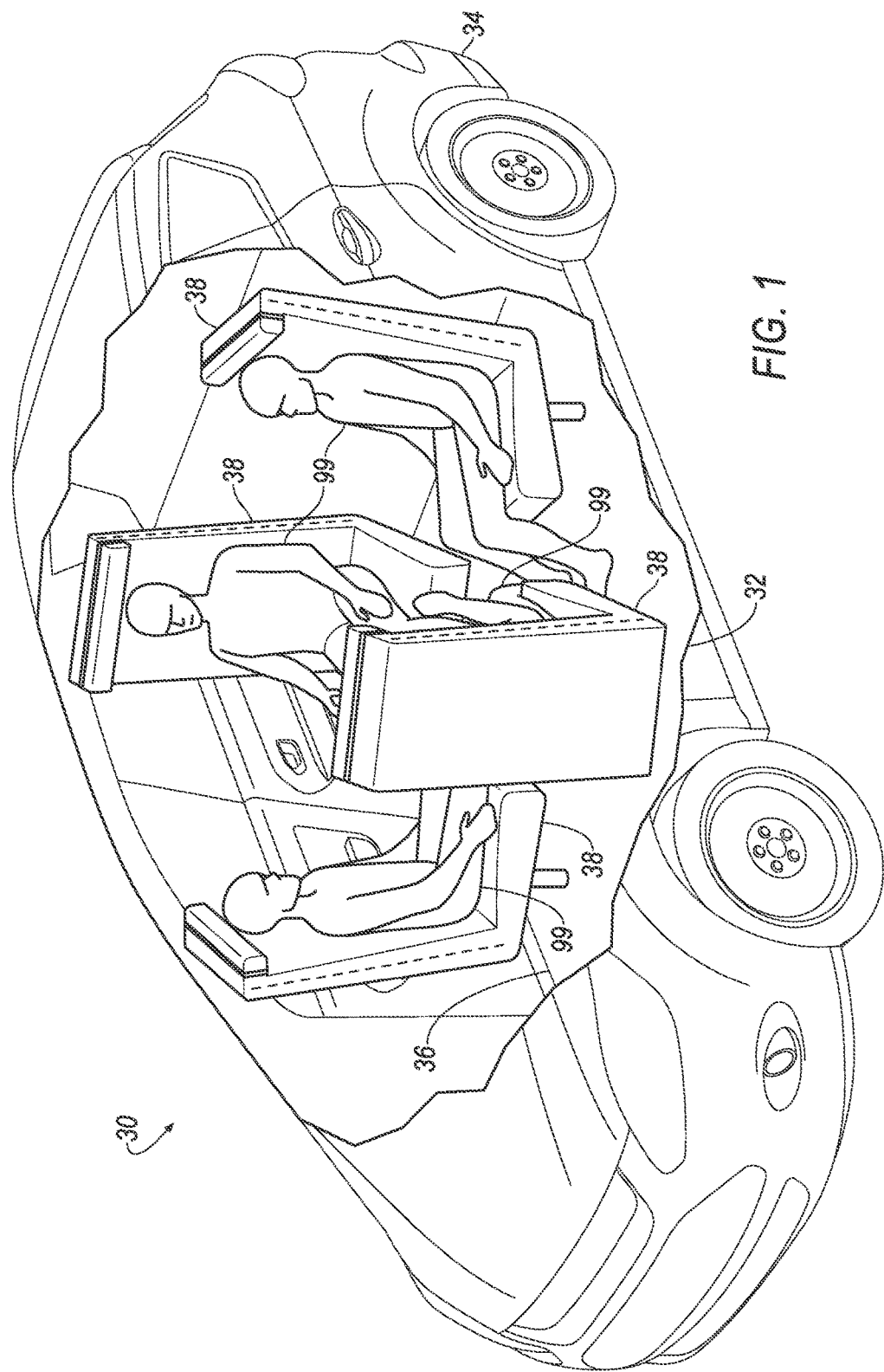
FIG. 1 is a perspective view of a vehicle with a passenger cabin exposed for illustration.

A seat includes a seat bottom and a seatback coupled to the seat bottom. The seatback includes a headrest and a front face facing the seat bottom. The seat includes an airbag inflatable from an undeployed position to a deployed position. The airbag in the undeployed position is supported by the front face above the headrest. The seat includes a tether extending from the seatback to the airbag.

The tether may be fixed to the seatback between the headrest and the seat bottom.

The tether may define a radial inflation path for the airbag. The path may be centered at the location where the tether is fixed to the seatback.

The seatback may include a side panel covering the tether in the undeployed position. The side panel may include a frangible seam extending along the tether and the side panel may be designed to be torn along the frangible seam by the tether during inflation of the airbag.

The side panel may be a first side panel, the seatback may include a second side panel opposite the first side panel, and the tether may extend from the first side panel to the second side panel.

The tether may be attached to the airbag at a location on the tether between where the tether is fixed to the first side panel and where the tether is fixed to the second side panel. The airbag may include a reinforcement area at the location where the tether is attached to the airbag. The reinforcement area may have a material thickness greater than a material thickness of the rest of the airbag.

The tether may have a first end and a second end each fixed to the seatback, and the tether may be attached to the airbag between the first end and the second end.

The airbag may include a main shell defining an inflation chamber and a wing defining a wing chamber in fluid communication with the inflation chamber. The main shell in the deployed position may extend from the seatback toward the seat bottom, and the wing in the deployed position may extend from the main shell toward the seatback.

The seatback may include a side panel extending from the front face. In the deployed position, the main shell may be designed to abut legs of an occupant and the wing may be designed to abut the side panel of the seatback.

The airbag may include a second wing opposite the wing in the deployed position, wherein the main shell, the seatback, the wing, and the second wing may be designed to surround an occupant.

The seat may include a second airbag supported by the seatback and inflatable from an undeployed position to a deployed position. The second airbag, in the deployed position, may extend from the seatback toward the airbag.

The airbag and the second airbag may each include an inflation chamber separate and distinct from each other.

A distance along the seatback from the seat bottom to the airbag in the undeployed position may be greater than a distance along the seatback from the seat bottom to the headrest.

In the deployed position, the airbag may be designed to abut legs of an occupant.

The seat may include a housing supported by the front face, wherein the airbag may be packaged into the housing such that, during a first stage of inflation of the airbag, the tether may be attached to the airbag on a surface generally facing the seatback. During a second stage of inflation of the airbag, the tether may be attached to the airbag on a surface generally facing the seat bottom. In the deployed position, the tether may be attached to the airbag on a surface generally facing away from the seatback.

The airbag may be inflatable in a direction generally perpendicular to the front face of the seatback.

In the undeployed position, the airbag in its entirety may be positioned above the headrest.

The seatback may include a first end coupled to the seat bottom and a second end spaced from the seat bottom. The front panel may include a longitudinal axis extending from the first end to the second end along the center of the front panel. The airbag in the undeployed position may cross the longitudinal axis.

The headrest may cross the longitudinal axis, and the airbag in the undeployed position may be positioned closer to the second end than the headrest.

The airbag in the deployed position may include an inner shell facing the seatback and an outer shell facing away from the seatback, and the tether may be attached to the outer shell.

With reference to the Figures, wherein like numerals indicate like parts throughout the several views, a seat 38 is generally shown. The seat 38 includes a seat bottom 42 and a seatback 40 coupled to the seat bottom 42. The seatback 40 includes a headrest 44 and a front face 84 facing the seat bottom 42. The seat 38 includes an airbag 56 inflatable from an undeployed position to a deployed position. The airbag 56 in the undeployed position is supported by the front face 84 above the headrest 44. The seat 38 includes a tether 68 extending from the seatback 40 to the airbag 56.

The seat having the airbag provides the benefits of airbag protection regardless of the orientation of the seat. In the event of an impact, the airbag can deploy and may prevent a secondary impact between an occupant sitting in the seat and a component of a passenger cabin of the vehicle, such as a dashboard, window, or pillar. Moreover, also in the event of an impact, the airbag may prevent or decrease the severity of loose objects in the passenger cabin striking the occupant. The seat having the airbag may thus reduce injuries to the occupant during an impact.

With reference to FIG. 1, a vehicle 30 may be an autonomous vehicle. A computer (not shown) can be configured to operate the vehicle 30 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

For example, the autonomous vehicle may include the seat 38. The seat 38 of the autonomous vehicle may include the seat bottom 42 and the seatback 40 coupled to the seat bottom 42. The seatback 40 may include the headrest 44 and the front face 84 facing the seat bottom 42. The seat 38 of the autonomous vehicle may include the airbag 56 inflatable from the undeployed position to the deployed position. The airbag 56 in the undeployed position may be supported by the front face 84 above the headrest 44. The seat 38 of the autonomous vehicle may include the tether 68 extending from the seatback 40 to the airbag 56.

The vehicle 30 includes a passenger cabin 32. The passenger cabin 32 houses occupants 99, if any, of the vehicle 30. The passenger cabin 32 may be surrounded and/or defined by a body 34 of the vehicle 30. A floor 36 may define a bottom of the passenger cabin 32. The passenger cabin 32 includes one or more seats 38 for occupants 99 of the vehicle 30 disposed on the floor 36 and coupled to the floor 36.

With reference to FIGS. 1-10, the seats 38 may be bucket seats, as shown in the Figures, bench seats, or another type of seat. Each seat 38 defines a front direction as a direction faced by an occupant 99 sitting in the seat 38. As shown in FIG. 1, the seats 38 may be rotatably coupled to the floor 36. The seats 38 may each be rotatable about a vertical axis relative to the passenger cabin 32. Each seat 38 may face a vehicle-forward direction, a vehicle-rearward direction, or any direction in between. Whichever direction the seat 38 is facing is the front direction relative to the seat 38.

The seat 38 may include the seatback 40, the seat bottom 42 coupled to the seatback 40, and the headrest 44 coupled to the seatback 40. The headrest 44 may be supported by the seatback 40 and may be stationary or movable relative to the seatback 40. The headrest 44 may be disposed on the front face 84 of the seatback 40. The seatback 40 may be supported by the seat bottom 42 and may be stationary or movable relative to the seat bottom 42. The seatback 40, the seat bottom 42, and/or the headrest 44 may be adjustable in multiple degrees of freedom. Specifically, the seatback 40, the seat bottom 42, and/or the headrest 44 may themselves be adjustable, in other words, have adjustable components within the seatback 40, the seat bottom 42, and/or the headrest 44, and/or may be adjustable relative to each other.

Figure 2:
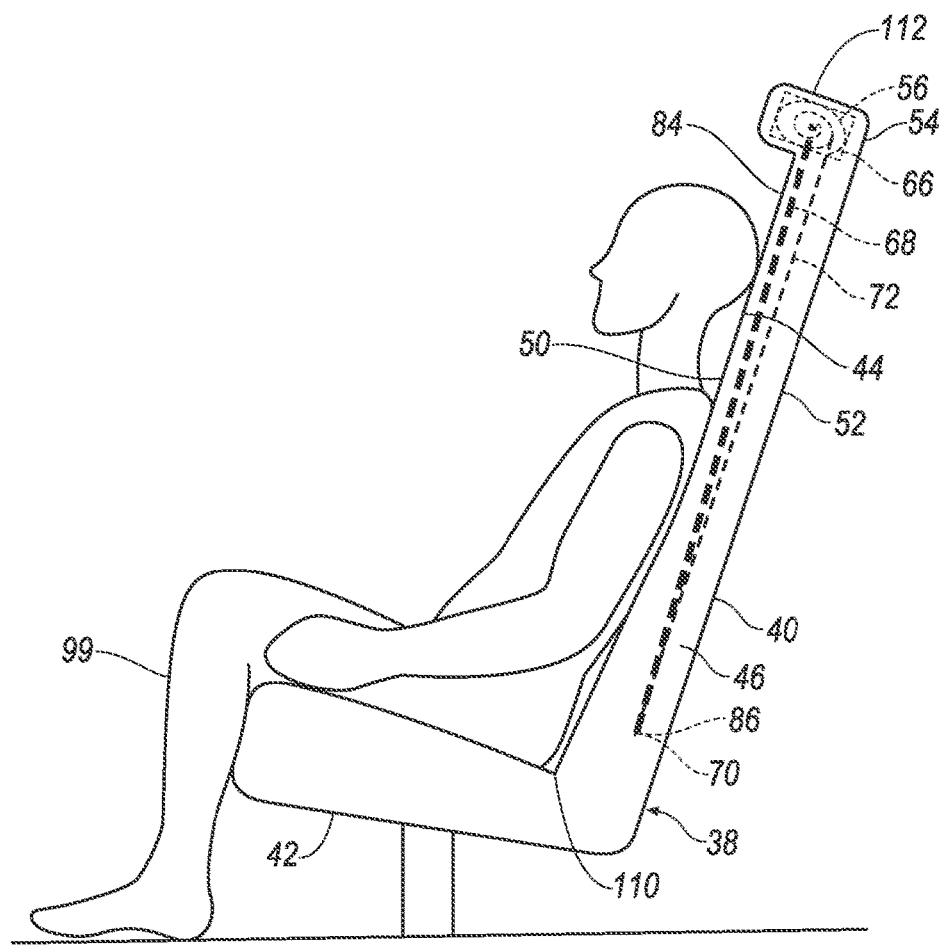
FIG. 2 is a side view of a seat of the passenger cabin having an airbag in an undeployed position.
Figure 3:
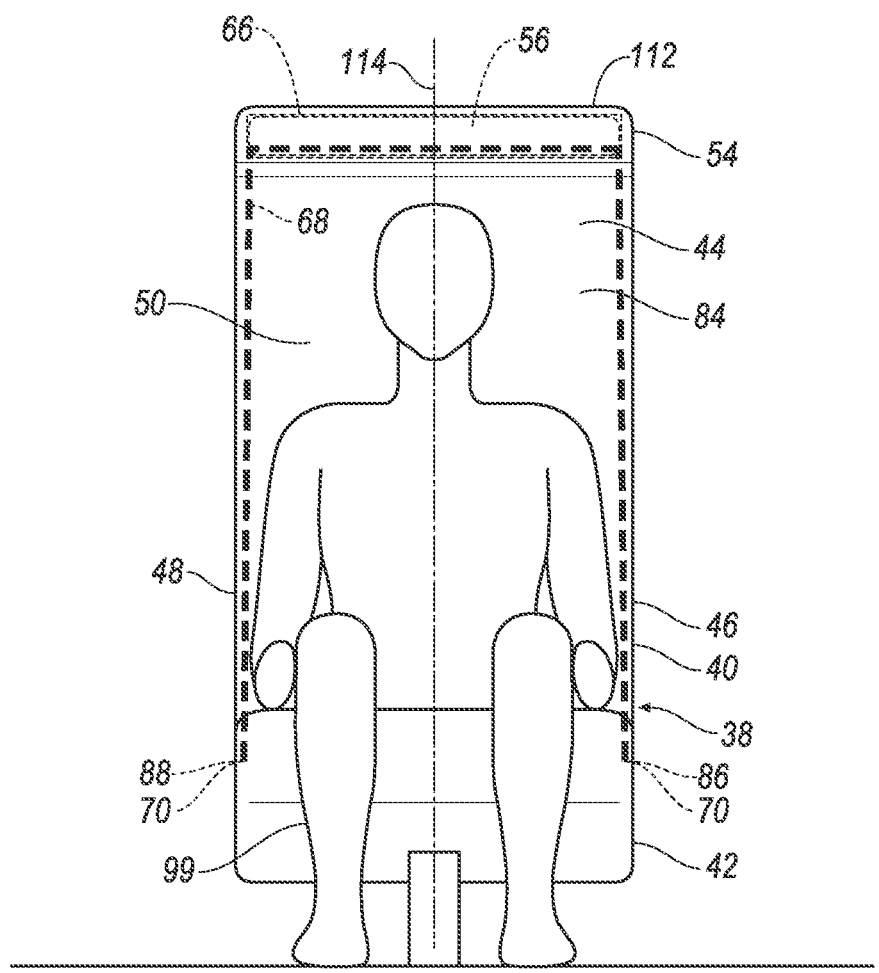
FIG. 3 is a front view of the seat having the airbag in the undeployed position.

With reference to FIGS. 2 and 3, the seatback 40 includes a first side panel 46, a second side panel 48 opposite the first side panel 46, a front panel 50 extending from the first side panel 46 to the second side panel 48, and a back panel 52 extending from the first side panel 46 to the second side panel 48. (The adjectives "first" and "second" are used throughout this document as identifiers and are not intended to signify importance or order.) The front panel 50 faces in the front direction relative to the seat 38, and may be disposed on the front face 84 of the seatback 40. The back panel 52 faces backward relative to the seat 38, i.e., an opposite direction to the front direction. The first side panel 46 and the second side panel 48 face laterally relative to the seat 38. The side panels 46, 48 may extend from the front panel 50 in a direction generally opposite the front direction. There may be one or more surfaces between the front panel 50 and the side panels 46, 48. The seatback 40 includes a top portion 54, which is the uppermost section of the seatback 40, i.e., a vehicle-upward end of the seatback 40. The top portion 54 may be part of the front panel 50 of the seatback 40. In such a configuration, the top portion 54 and the front panel 50 face in the same direction, specifically, face forward relative to the seat 38.

With continued reference to FIGS. 2 and 3, the seatback 40 may include a first end 110 coupled to the seat bottom 42 and a second end 112 spaced from the seat bottom 42, e.g., the second end 112 may be disposed on the top portion 54. The front panel 50 may include a longitudinal axis 114 extending from the first end 110 to the second end 112 along the center of the front panel 50, e.g., the longitudinal axis 114 is disposed equally between the first side panel 46 and the second side panel 48. The airbag 56 in the undeployed position may cross the longitudinal axis 114. That is, the airbag 56 may extend continuously across the longitudinal axis 114 from one side to the other.

With continued reference to FIGS. 2 and 3, a distance along the seatback 40 from the seat bottom 42 to the airbag 56 in the undeployed position may be greater than a distance along the seatback 40 from the seat bottom 42 to the headrest 44. As one example, the airbag 56 in its entirety may be positioned above the headrest 44, e.g., the airbag 56 may be positioned further from the seat bottom 42 than the headrest 44. As another example, only a portion of the airbag 56 in the undeployed position may be positioned above the headrest 44. The headrest 44 may cross the longitudinal axis 114, e.g., the headrest 44 may extend continuously across the longitudinal axis 114 from one side to the other, and the airbag 56 in the undeployed position may be positioned closer to the second end 112 than the headrest 44. For example, a distance along the seatback 40 from the second end 112 to the airbag 56 in the undeployed position may be less than a distance along the seatback 40 from the second end 112 to the headrest 44. The airbag 56 may be positioned at or near the second end 112. As another example, the airbag 56 in the undeployed position may be positioned above the seatback 40.

With reference to FIGS. 2-10, the seatback 40 includes the airbag 56. The airbag 56 is inflatable from an undeployed position, as shown in FIGS. 2 and 3, to a deployed position, as shown in FIGS. 6-10. For example, the airbag 56 may be inflatable in a direction generally perpendicular to the front face 84 of the seatback 40. The airbag 56 includes an inflation chamber 58 and a main shell 60 surrounding and defining the inflation chamber 58. The main shell 60 may be formed of panels stitched together (not shown). The main shell 60 includes an outer shell 62 and an inner shell 64. When the airbag 56 is in the deployed position, the outer shell 62 faces away from the seatback 40 of the seat 38, i.e., front relative to the seat 38, and the inner shell 64 faces toward the seatback 40 of the seat 38, i.e., presses against the occupant 99 of the seat 38. The outer shell 62 and the inner shell 64 may or may not correspond to the panels of the airbag 56.

The airbag 56, i.e., the panels of the airbag 56, may be formed of any suitable airbag material, for example, a woven polymer. For example, the airbag 56 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

Figure 4:
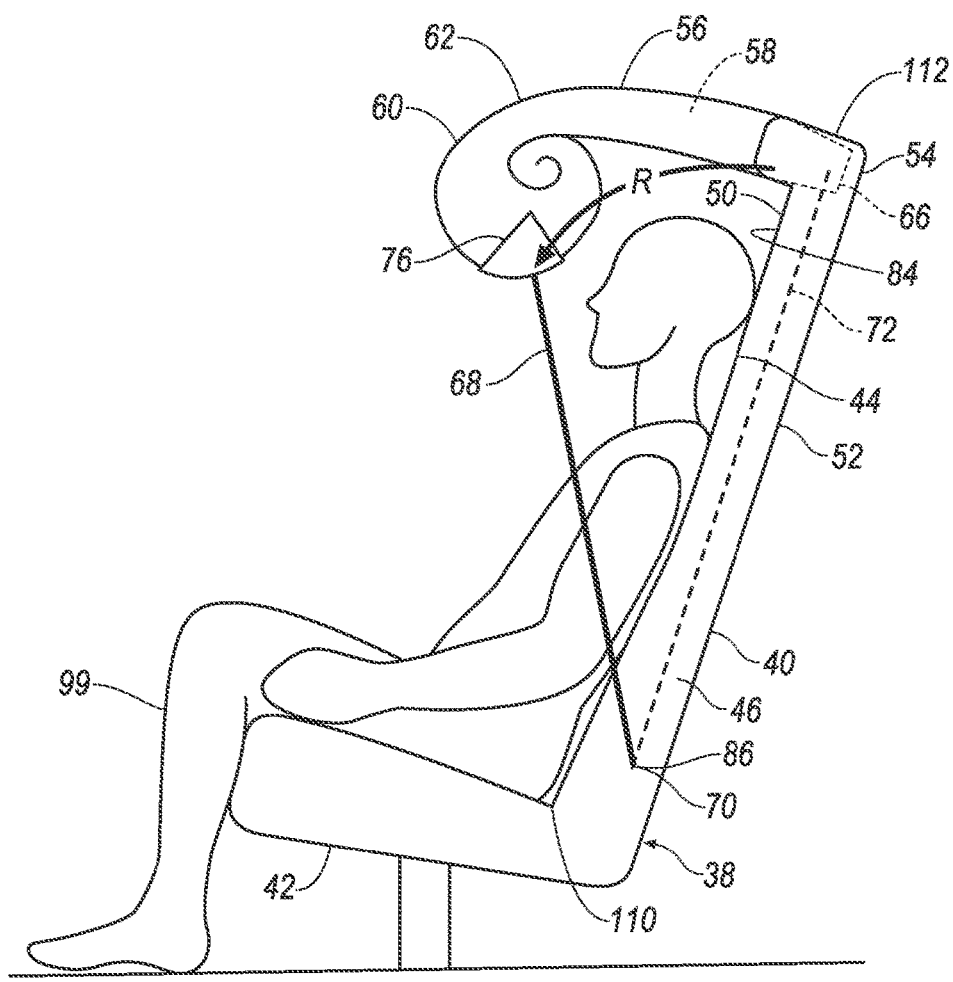
FIG. 4 is a side view of the seat having the airbag in a partially deployed position.
Figure 5:
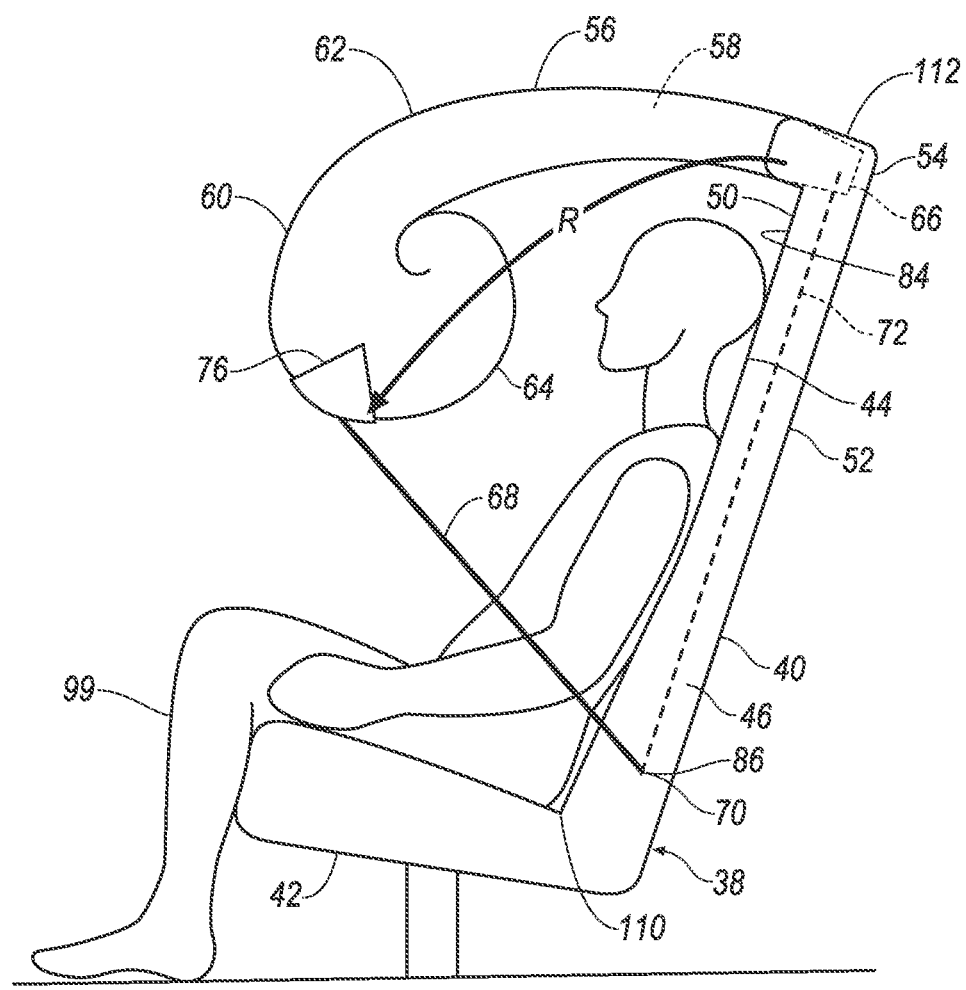
FIG. 5 is a side view of the seat having the airbag in another partially deployed position.

With reference to FIGS. 2 and 3, the airbag 56 is inflatable from the undeployed position in the top portion 54. In the undeployed position, the airbag 56 is disposed in a housing 66 disposed in the top portion 54 of the seatback 40 and supported by the front face 84. In the undeployed position, the airbag 56 may be coiled or folded, and the outer shell 62 or portions of the outer shell 62 may be closer to the occupant 99 than the inner shell 64 or portions of the inner shell 64 (i.e., the reverse of when the airbag 56 is in the deployed position). For example, the airbag 56 may be packaged into the housing 66 such that, during a first stage of inflation of the airbag 56 (as shown in FIG. 4), the tether 68 may be attached to the airbag 56 on a surface generally facing the seatback 40. During a second stage of inflation of the airbag 56 (as shown in FIG. 5), the tether 68 may be attached to the airbag 56 on a surface generally facing the seat bottom 42. In the deployed position (as shown in FIGS. 6-10), the tether 68 may be attached to the airbag 56 on a surface generally facing away from the seatback 40, e.g., the outer shell 62.

With reference to FIGS. 2-10, the tether 68 is fixed to the seatback 40 below the top portion 54 and attached to the airbag 56. For example, the tether 68 may be fixed to the seatback 40 between the headrest 44 and the seat bottom 42 when viewed from a side view, such as in FIGS. 4-6. The tether 68 may be fixed at a location near an intersection of the seatback 40 and the seat bottom 42. The tether 68 extends from the first side panel 46 to the second side panel 48. More specifically, one end of the tether 68 is attached to an attachment point 70 at the first side panel 46, and the other end of the tether 68 is attached to an attachment point 70 at the second side panel 48. The positions of the two attachment points 70 may be symmetrical about the seat 38. For example, the attachment points 70 may be between the headrest 44 and the seat bottom 42. Between the two attachment points 70, the tether 68 is attached to the airbag 56. The tether 68 is movable from an undeployed position when the airbag 56 is in the undeployed position to a deployed position when the airbag 56 is in the deployed position.

With reference to FIGS. 2 and 3, in the undeployed position, the tether 68 extends from one of the attachment points 70 beneath one of the side panels 46, 48 to the airbag 56, and from the airbag 56 beneath the other of the side panels 46, 48 to the other of the attachment points 70. For example, the side panels 46, 48 may cover the tether 68 in the undeployed position. The portions of the tether 68 extending beneath the side panels 46, 48 are covered by the side panels 46, 48. The tether 68 extends between the outer shell 62 portion and the front panel 50 of the seatback 40 when the airbag 56 is in the undeployed position; in other words, at least some of the outer shell 62 is farther from the front panel 50 than the portion of the tether 68 attached to the airbag 56 when the airbag 56 is in the undeployed position.

With reference to FIGS. 2, 4-6, and 9, the side panels 46, 48 each include a frangible seam 72 extending along the tether 68 in the undeployed position. The seams 72 may extend substantially vertically along each side panel 46, 48. The portions of the tether 68 extending beneath the side panels 46, 48 extend substantially parallel to the seams 72. Each seam 72 may extend from the attachment point 70 or from a second attachment point 74 to the top portion 54. The seams 72 are frangible relative to the rest of the side panels 46, 48, i.e., tear or separate at a lower tensile stress than the tensile stress at which the rest of the side panel 46, 48 tears or separates. For example, the seams 72 may each be a series of perforations, may each be a line of material thinner than the rest of the side panels 46, 48, etc. The side panels 46, 48 may be designed to be torn along the frangible seams 72 during inflation of the airbag 56.

With reference to FIGS. 6-10, the airbag 56 is inflatable to the deployed position attached to the top portion 54 and extending in front of the front panel 50. The airbag 56 may extend completely laterally across the front panel 50, i.e., extend laterally past the first side panel 46 and past the second side panel 48. The airbag 56 extends to legs of the occupant 99. For example, the airbag 56, e.g., the main shell 60, may be designed to abut legs of the occupant 99 in the deployed position. The airbag 56 extends most of the way from the top portion 54 to the seat bottom 42, e.g., extends more than halfway from the top portion 54 to the seat bottom 42. The airbag 56 in the deployed position extends between the tether 68 and the seatback 40. More specifically, the outer shell 62 portion extends between the tether 68 and the front panel 50 of the seatback 40 when the airbag 56 is in the deployed position. In other words, the portion of the tether 68 that is attached to the airbag 56 is farther from the front panel 50 of the seatback 40 than the outer shell 62 when the airbag 56 is in the deployed position (as opposed to the outer shell 62 being farther away from the front panel 50 of the seatback 40 than the portion of the tether 68 attached to the airbag 56 when the airbag 56 is in the undeployed position).

Figure 6:
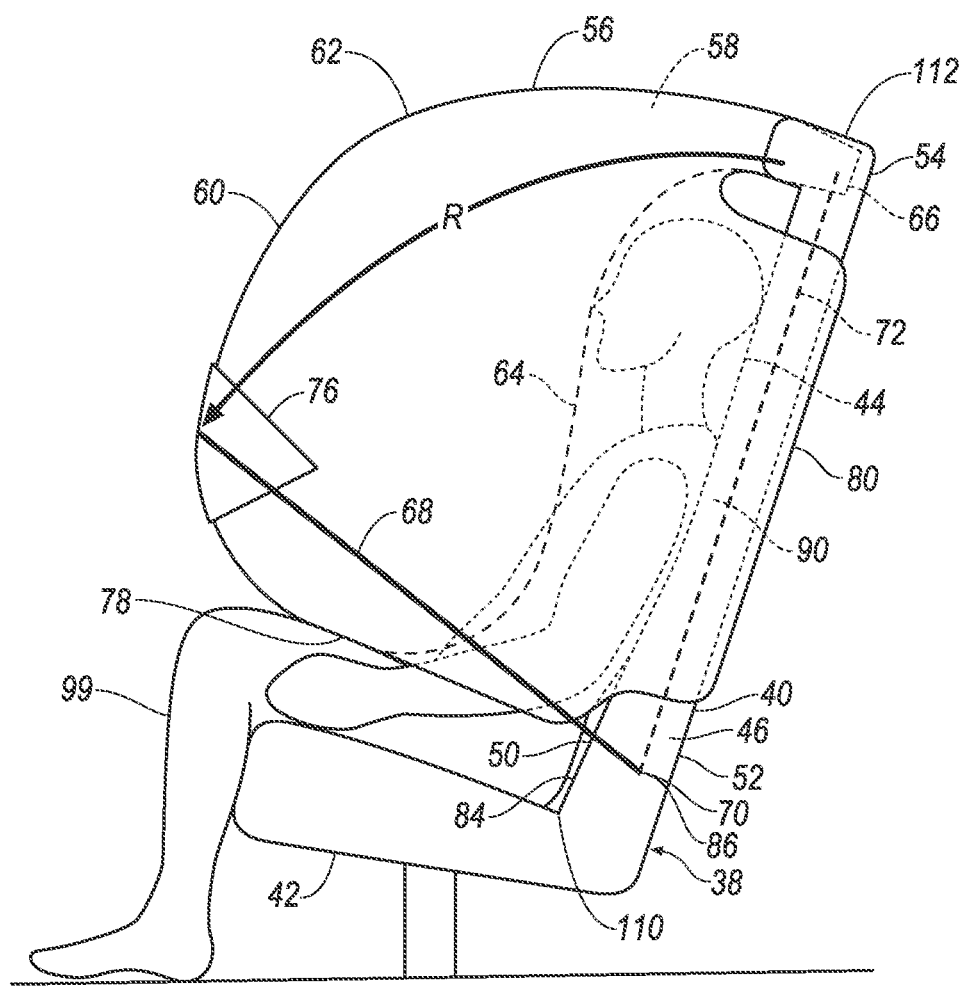
FIG. 6 is a side view of the seat having the airbag in a deployed position.
Figure 7:
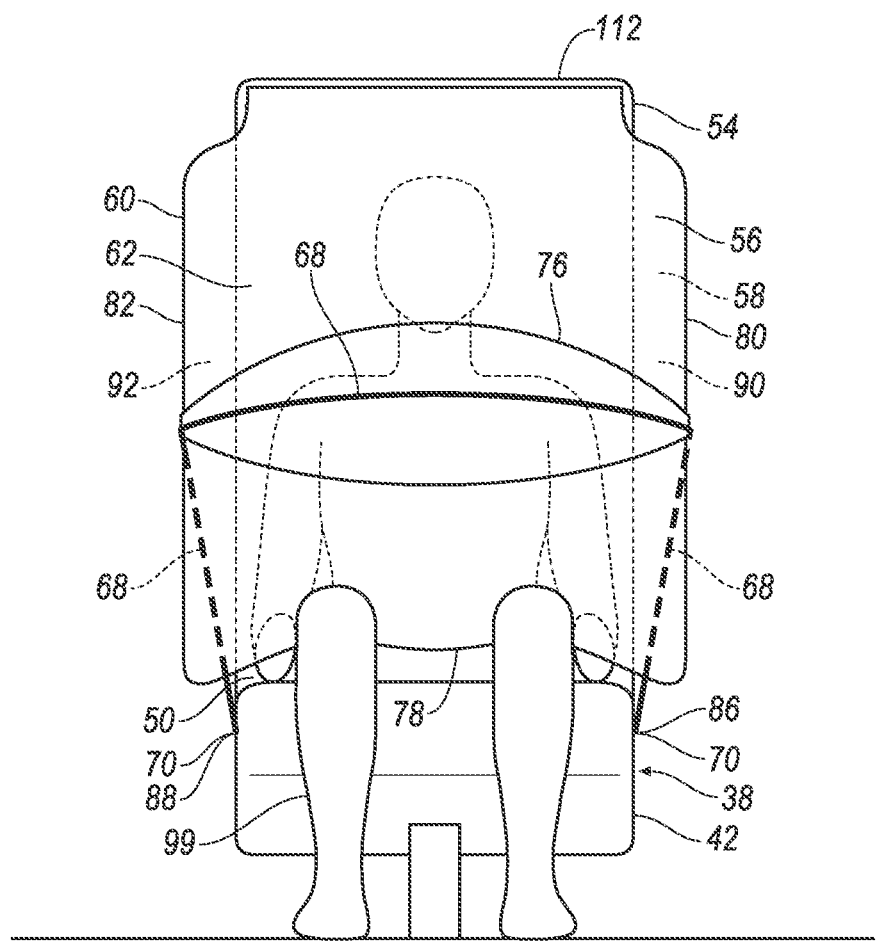
FIG. 7 is a front view of the seat having the airbag in the deployed position.
Figure 8:
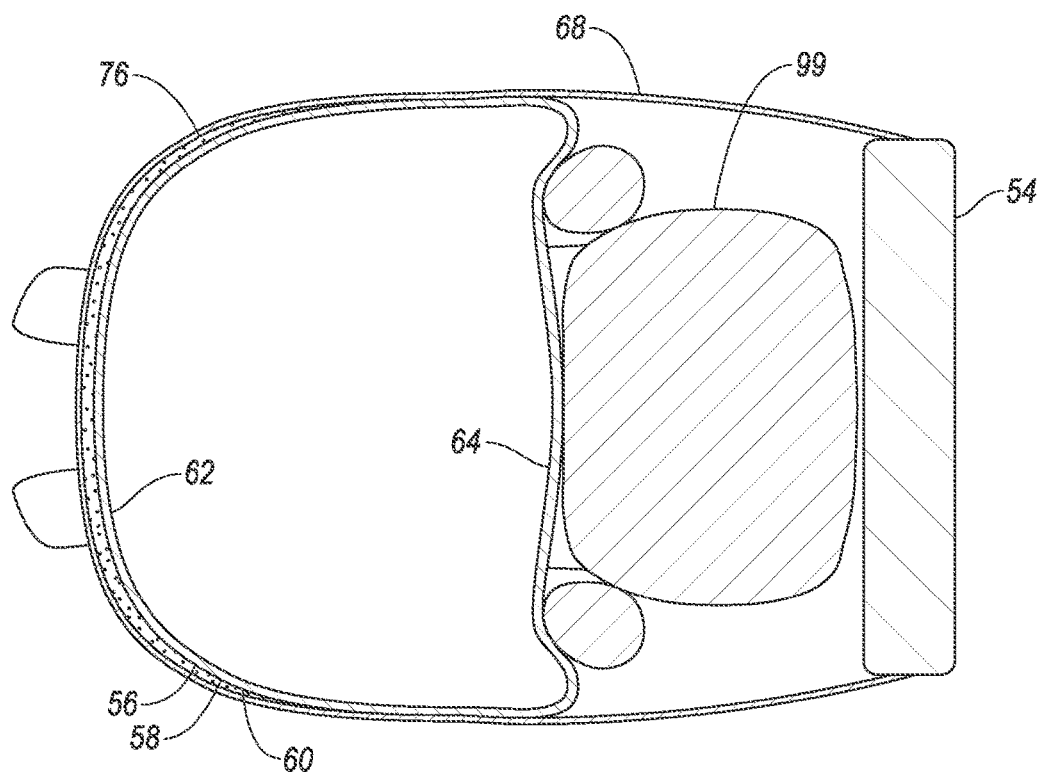
FIG. 8 is a cross-sectional view of the seat having the airbag in the deployed position.

With continued reference to FIGS. 6-8, in the deployed position, the tether 68 extends out of one of the side panels 46, 48 to the airbag 56 in the deployed position to the other of the side panels 46, 48. The tether 68 extends in the front direction from the attachment points 70 and extends laterally across the airbag 56. The tether 68 extends outside the airbag 56 relative to the seatback 40. The tether 68 may be attached to the outer shell 62 of the airbag 56 and the tether 68 may extend around the outer shell 62. The tether 68 constrains the airbag 56 against the occupant 99 pushing into the airbag 56 during an impact.

With reference to FIGS. 2 and 4-6, the tether 68 defines a radial inflation path R for the airbag 56. The radial inflation path R is centered around the attachment points 70, i.e., centered where the tether 68 is fixed to the seatback 40. As the airbag 56 uncoils or unfolds between the undeployed position and the deployed position, the outer shell 62 moves from outside the portion of the tether 68 attached to the airbag 56 relative to the front panel 50 of the seatback 40, to inside the portion of the tether 68 attached to the airbag 56 relative to the front panel 50 of the seatback 40. In other words, the outer shell 62 rotates about the portion of the tether 68 attached to the airbag 56 during inflation.

With reference to FIGS. 4-10, the airbag 56 may include a reinforcement panel 76 extending between the first tether 68 and the main shell 60 and attached to the main shell 60.

More specifically, the reinforcement panel 76 may be attached to the outer shell 62. The reinforcement panel 76 extends on an outer surface of the outer shell 62. In other words, the reinforcement panel 76 does not define the inflation chamber 58, and the outer shell 62 extends completely between the reinforcement panel 76 and the inflation chamber 58. The reinforcement panel 76 is an additional layer of material such that the airbag 56 has a thicker wall where the reinforcement panel 76 is disposed on the main shell 60 than for the rest of the main shell 60. The reinforcement panel 76 may be formed of the same material as the main shell 60 or of a different material.

The tether 68 may be attached to the airbag 56 at a location on the tether 68 between where the tether 68 is fixed to the first side panel 46, i.e., the attachment point 70, and where the tether 68 is fixed to the second side panel 48, i.e., the attachment point 70. For example, the tether 68 may have a first end 86 and a second end 88 each fixed to the seatback 40, e.g., the first end 86 may be fixed to the first side panel 46 and the second end 88 may be fixed to the second side panel 48. The tether 68 may be attached to the airbag 56 between the first end 86 and the second end 88. The airbag 56 may include a reinforcement area, e.g., the reinforcement panel 76, at the location where the tether 68 is attached to the airbag 56. The reinforcement area, e.g., the reinforcement panel 76, may have a material thickness greater than a material thickness of the rest of the airbag 56.

With reference to FIGS. 6 and 7, in the deployed position, the airbag 56 includes a main body 78, a first wing 80, and a second wing 82 opposite the first wing 80. For example, in the deployed position, the first wing 80 may be on one side of the main shell 60 and the second wing 82 may be on another side of the main shell 60, with the main body 78 and the inflation chamber 58 separating the wings 80, 82 from each other. The main body 78 is disposed in front of the front panel 50 of the seatback 40 and in front of the occupant 99. For example, in the deployed position, the main body 78 and the main shell 60 may extend from the seatback 40 toward the seat bottom 42.

When the airbag 56 is in the deployed position, the first wing 80 extends from the main body 78 and the main shell 60 toward the seatback 40, e.g., the first side panel 46, and the second wing 82 extends from the main body 78 and the main shell 60 toward the seatback 40, e.g., the second side panel 48. For example, in the deployed position, the wings 80, 82 may be designed to abut the side panels 46, 48 of the seatback 40. In the deployed position, the main shell 60, the seatback 40, the seat bottom 42, the wing 80, and the second wing 82 may be designed to surround the occupant 99 to absorb energy from the occupant regardless of the direction of impact, e.g., side impact, front impact, rear impact, rollover impact, etc., and regardless of the position of the seat 38, i.e., the direction the seat 38 faces. The main shell 60, the seatback 40, the seat bottom 42, the wing 80, and the second wing 82 allow the seat 38 to be designed without seat belts. In other words, the main shell 60, the seatback 40, the seat bottom 42, the wing 80, and the second wing 82 restrain the occupant 99 so that a seat belt is not needed, i.e., the seat 38 may be designed without a seat belt or the occupant 99 may opt to not use the belt in certain conditions. Since the airbag 56 deploys from the top portion 54 of the seatback 40, the airbag 56 retains the occupant 99 on the seat 38 during rollover events.

The wings 80, 82 extend between the tether 68 and the front panel 50. The wings 80, 82 extend beside arms of the occupant 99. The wings 80, 82 extend between the tether 68 and the occupant 99. The wing 80 may define a wing chamber 90, and the second wing 82 may define a second wing chamber 92. The wing chambers 90, 92 may be in fluid communication with the inflation chamber 58.

Figure 9:
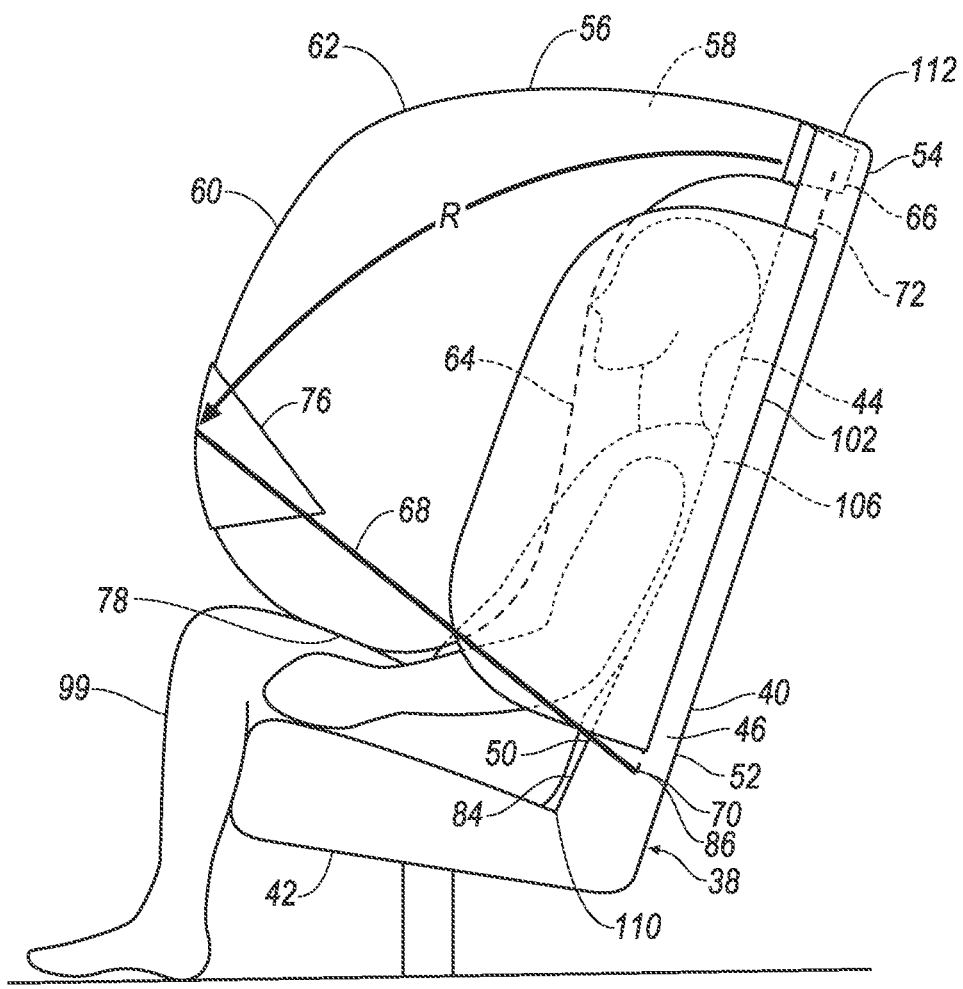
FIG. 9 is a side view of the seat having the airbag and a second airbag in the deployed position.
Figure 10:
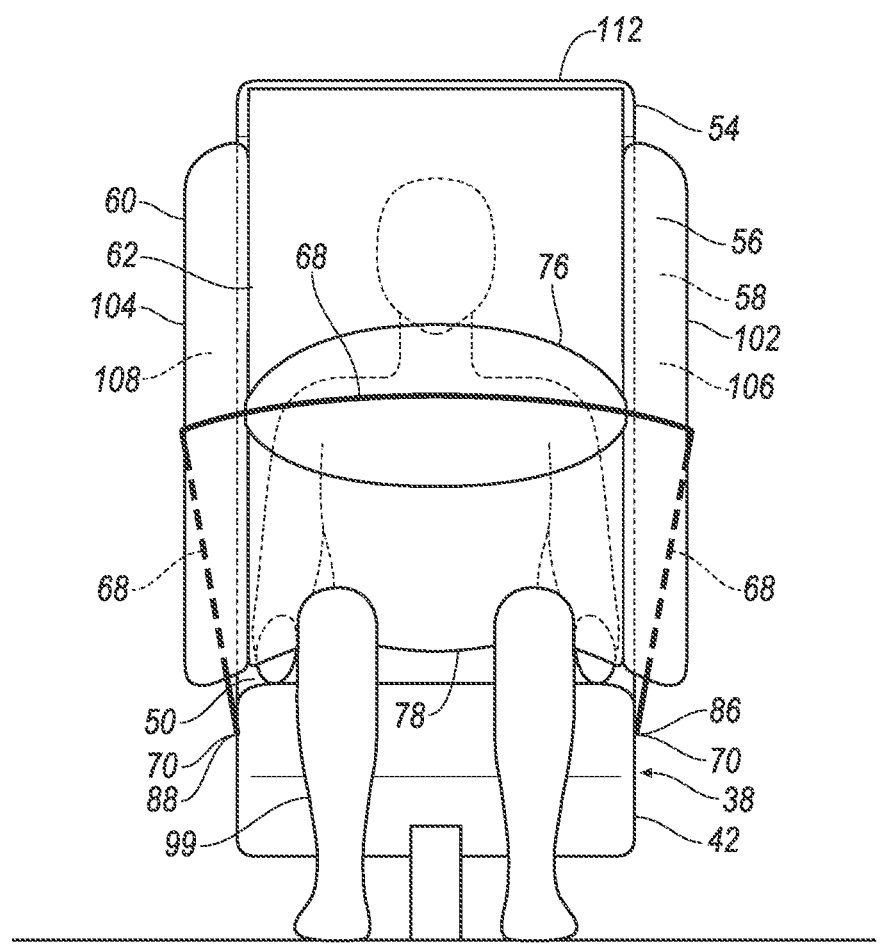
FIG. 10 is a front view of the seat having the airbag, the second airbag, and a third airbag in the deployed position.

With reference to FIGS. 9 and 10, the seat 38 may include a second airbag 102 and a third airbag 104 each supported by the seatback 40. The second and third airbags 102, 104 may also be referred to as side air bags. The second and third airbags 102, 104 may be inflatable from an undeployed position to a deployed position. In the deployed position, the second and third airbags 102, 104 may extend from the seatback 40 toward the airbag 56. For example, the second airbag 102 may extend from the first side panel 46 toward the main body 78, and the third airbag 104 may extend from the second side panel 48 toward the main body 78. The second airbag 102 may include a second inflation chamber 106 and the third airbag may include a third inflation chamber 108. The second and third inflation chambers 106, 108 may each be separate and distinct from the inflation chamber 58 of the airbag 56. For example, there may be no fluid communication between the inflation chamber 58 and the second and third inflation chambers 106, 108.

Figure 11:
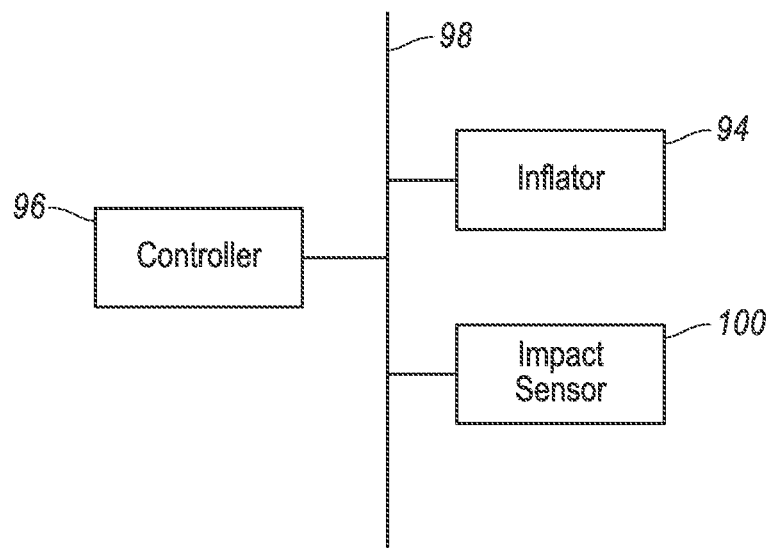
FIG. 11 is a block diagram of a control system of the airbag.

With reference to FIG. 11, an inflator 94 may be connected to the airbag 56 and in communication with the inflation chamber 58 of the airbag 56 and the wing chambers 90, 92 of the wings 80, 82. Upon receiving a signal from, e.g., a controller 96, the inflator 94 may inflate the airbag 56 with an inflatable medium, such as a gas. Specifically, the inflator 94 inflates the inflation chamber 58 of the airbag 56 and the wing chambers 90, 92 of the wings 80, 82. The inflator 94 may be, for example, a pyrotechnic inflator that uses a chemical reaction to drive inflation medium to the airbag 56. The inflator 94 may be of any suitable type, for example, a cold-gas inflator. As one example, the inflator 94 may inflate the second and third airbags 102, 104 in addition to the airbag 56. As another example, there may be another inflator 94 connected to the second airbag 102 and/or the third airbag 104.

The controller 96 is a microprocessor-based controller. The controller 96 includes a processor, memory, etc. The memory of the controller 96 includes memory for storing instructions executable by the processor as well as for electronically storing data and/or databases. The controller 96 may be the same or a different device than the computer responsible for autonomously controlling the vehicle 30.

The controller 96 may transmit signals through a communications network 98 such as a controller area network (CAN) bus, Ethernet, WiFi, Local Interconnect Network (LIN), onboard diagnostics connector (OBD-II), and/or by any other wired or wireless communications network. The controller 96 may be in communication with the inflator 94 and an impact sensor 100 via the communications network 98.

With continued reference to FIG. 11, the impact sensor 100 is adapted to detect an impact to the vehicle 30. The impact sensor 100 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 100 may be located at numerous points in or on the vehicle 30.

In the event of an impact to the vehicle 30, the impact sensor 100 may detect the impact and transmit a signal through the communications network 98 to the controller 96. The controller 96 may transmit a signal through the communications network 98 to the inflator 94. The inflator 94 may discharge and inflate the airbag 56. During inflation, the airbag 56 uncoils or unfolds in front of the occupant 99 of the seat 38. The outer shell 62 of the airbag 56 that is attached to the tether 68 uncoils or unfolds along the radial inflation path R as the tether 68 tears through the seams 72 between the attachment points 70 and the top portion 54. The inner shell 64 of the airbag 56 in the undeployed position is farther from the front panel 50 of the seatback 40 than the outer shell 62, and the inner shell 64 of the airbag 56 in the deployed position is closer to the front panel 50 than the seatback 40. A centroid of the airbag 56 thus deploys more downward than forward relative to the seatback 40, keeping the airbag 56 closer to a torso of the occupant 99 during deployment. The airbag 56 may thus mostly extend around exposed portions of the occupant 99, providing protection during an impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. "Substantially" as used herein means that a dimension, time duration, shape, or other adjective may vary slightly from what is described due to physical imperfections, power interruptions, variations in machining or other manufacturing, etc.

What is claimed is:

1. A seat comprising:
   a seat bottom;
   a seatback coupled to the seat bottom, the seatback having a headrest and a front face facing the seat bottom;
   an airbag inflatable from an undeployed position to a deployed position, the airbag in the undeployed position being supported by the front face above the headrest; and
   a tether extending from the seatback to the airbag;
   wherein the tether is fixed to the seatback between the headrest and the seat bottom;
   wherein the tether defines a radial inflation path for the airbag, the path centered at the location where the tether is fixed to the seatback.

2. The seat of claim 1, wherein the seatback includes a side panel covering the tether in the undeployed position, the side panel including a frangible seam extending along the tether and the side panel being designed to be torn along the frangible seam by the tether during inflation of the airbag.

3. The seat of claim 2, wherein the side panel is a first side panel, the seatback includes a second side panel opposite the first side panel, and the tether extends from the first side panel to the second side panel.

4. The seat of claim 3, wherein the tether is attached to the airbag at a location on the tether between where the tether is fixed to the first side panel and where the tether is fixed to the second side panel, and the airbag includes a reinforcement area at the location where the tether is attached to the airbag, the reinforcement area having a material thickness greater than a material thickness of the rest of the airbag.

5. The seat of claim 1, wherein the tether has a first end and a second end each fixed to the seatback, and the tether is attached to the airbag between the first end and the second end.

6. The seat of claim 1, wherein the airbag includes a main shell defining an inflation chamber and a wing defining a wing chamber in fluid communication with the inflation chamber, the main shell in the deployed position extending from the seatback toward the seat bottom, and the wing in the deployed position extending from the main shell toward the seatback.

7. The seat of claim 6, wherein the seatback includes a side panel extending from the front face, and in the deployed position, the main shell is designed to abut legs of an occupant and the wing is designed to abut the side panel of the seatback.

8. The seat of claim 6, wherein the airbag includes a second wing opposite the wing in the deployed position, wherein the main shell, the seatback, the wing, and the second wing are designed to surround an occupant.

9. The seat of claim 1, further comprising a second airbag supported by the seatback and inflatable from an undeployed position to a deployed position, the second airbag, in the deployed position, extending from the seatback toward the airbag.

10. The seat of claim 9, wherein the airbag and the second airbag each include an inflation chamber separate and distinct from each other.

11. The seat of claim 1, wherein a distance along the seatback from the seat bottom to the airbag in the undeployed position is greater than a distance along the seatback from the seat bottom to the headrest.

12. The seat of claim 1, wherein in the deployed position, the airbag is designed to abut legs of an occupant.

13. The seat of claim 1, further comprising a housing supported by the front face, wherein the airbag is packaged into the housing such that, during a first stage of inflation of the airbag, the tether is attached to the airbag on a surface generally facing the seatback, and during a second stage of inflation of the airbag, the tether is attached to the airbag on a surface generally facing the seat bottom, and in the deployed position, the tether is attached to the airbag on a surface generally facing away from the seatback.

14. The seat of claim 1, wherein the airbag is inflatable in a direction generally perpendicular to the front face of the seatback.

15. The seat of claim 1, wherein in the undeployed position, the airbag in its entirety is positioned above the headrest.

16. The seat of claim 1, wherein the seatback includes a first end coupled to the seat bottom and a second end spaced from the seat bottom, and the front panel includes a longitudinal axis extending from the first end to the second end along the center of the front panel, and the airbag in the undeployed position crosses the longitudinal axis.

17. The seat of claim 16, wherein the headrest crosses the longitudinal axis, and the airbag in the undeployed position is positioned closer to the second end than the headrest.

18. The seat of claim 1, wherein the airbag in the deployed position includes an inner shell facing the seatback and an outer shell facing away from the seatback, and the tether is attached to the outer shell.

19. A seat comprising:
   a seat bottom;
   a seatback coupled to the seat bottom, the seatback having a headrest and a front face facing the seat bottom;
   an airbag inflatable from an undeployed position to a deployed position, the airbag in the undeployed position being supported by the front face above the headrest; and
   a tether extending from the seatback to the airbag;
   wherein the seatback includes a side panel covering the tether in the undeployed position, the side panel including a frangible seam extending along the tether and the side panel being designed to be torn along the frangible seam by the tether during inflation of the airbag;

wherein the side panel is a first side panel, the seatback includes a second side panel opposite the first side panel, and the tether extends from the first side panel to the second side panel.

20. A seat comprising:

a seat bottom;

a seatback coupled to the seat bottom, the seatback having a headrest and a front face facing the seat bottom;

an airbag inflatable from an undeployed position to a deployed position, the airbag in the undeployed position being supported by the front face above the headrest; and a tether extending from the seatback to the airbag;

wherein the airbag includes a main shell defining an inflation chamber and a wing defining a wing chamber in fluid communication with the inflation chamber, the main shell in the deployed position extending from the seatback toward the seat bottom, and the wing in the deployed position extending from the main shell toward the seatback;

wherein the seatback includes a side panel extending from the front face, and in the deployed position, the main shell is designed to abut legs of an occupant and the wing is designed to abut the side panel of the seatback.

21. A seat comprising:

a seat bottom;

a seatback coupled to the seat bottom, the seatback having a headrest and a front face facing the seat bottom;

an airbag inflatable from an undeployed position to a deployed position, the airbag in the undeployed position being supported by the front face above the headrest;

a tether extending from the seatback to the airbag; and a housing supported by the front face, wherein the airbag is packaged into the housing such that, during a first stage of inflation of the airbag, the tether is attached to the airbag on a surface generally facing the seatback, and during a second stage of inflation of the airbag, the tether is attached to the airbag on a surface generally facing the seat bottom, and in the deployed position, the tether is attached to the airbag on a surface generally facing away from the seatback.

* * * * *